(12) United States Patent
Wang et al.

(10) Patent No.: US 8,311,193 B2
(45) Date of Patent: Nov. 13, 2012

(54) CHARGING METHOD AND CONTROL DEVICE FOR GROUP MAIN LINE SERVICE

(75) Inventors: Sheng Wang, Shenzhen (CN); Zhenghui Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 446 days.

(21) Appl. No.: 12/551,754

(22) Filed: Sep. 1, 2009

(65) Prior Publication Data

US 2010/0008483 A1 Jan. 14, 2010

Related U.S. Application Data

(63) Continuation of application No. PCT/CN2007/071301, filed on Dec. 21, 2007.

(30) Foreign Application Priority Data

Mar. 1, 2007 (CN) .......................... 2007 1 0005605

(51) Int. Cl.
*H04M 15/00* (2006.01)

(52) U.S. Cl. .............. 379/114.01; 379/221.12; 379/222; 455/406; 455/414.1

(58) Field of Classification Search ............. 379/221.09, 379/221.12, 222, 111, 114.01; 455/406, 455/414.1
See application file for complete search history.

(56) References Cited

U.S. PATENT DOCUMENTS

| | | | |
|---|---|---|---|
| 5,892,821 A | 4/1999 | Turner | |
| 2004/0133685 A1* | 7/2004 | Jaaskela et al. | 709/227 |
| 2006/0177029 A1* | 8/2006 | Dotan et al. | 379/114.01 |
| 2006/0205404 A1* | 9/2006 | Gonen et al. | 455/432.1 |
| 2010/0008483 A1* | 1/2010 | Wang et al. | 379/114.01 |

FOREIGN PATENT DOCUMENTS

| | | |
|---|---|---|
| CN | 1444377 | 9/2003 |
| CN | 1756285 A | 4/2006 |
| CN | 1788456 | 6/2006 |
| CN | 101039364 | 9/2007 |

(Continued)

OTHER PUBLICATIONS

Fourth Office Action (with partial translation) issued in corresponding Chinese Patent Application No. 200710005605.X, mailed Aug. 19, 2010. 10 pages.

(Continued)

*Primary Examiner* — Gerald Gauthier
*Assistant Examiner* — Simon King
(74) *Attorney, Agent, or Firm* — Brinks Hofer Gilson & Lione

(57) ABSTRACT

A charging method for group main line, GML, service is disclosed. For an outgoing call from an extension of the GML, the initiated call is identified by adding a prefix for group service before the called number. When an intelligent network, IN, finds that there is the prefix for group service before the called number, the call is processed as collectively paid by the GML. A service control point, SCP, generates a call record for the call and places a special identification code in the call record. An incoming call redirected through the GML is also processed as collectively paid by the GML. The SCP generates a call record for the call and places a special identification code in the call record. The present invention also discloses a service control device.

9 Claims, 8 Drawing Sheets

FOREIGN PATENT DOCUMENTS

| | | |
|---|---|---|
| WO | 2004/098211 A1 | 11/2004 |
| WO | WO 2004098211 A1 * | 11/2004 |

OTHER PUBLICATIONS

Office Action issued in corresponding Chinese Patent Application No. 200710005605.X, mailed Jan. 6, 2011.

Zhao, Yongbin et al.: "Fixed network is facing a more rigorous challenge due to the appearance of the 'mobile telephone exchange' service", Communication Business Management, Apr. 30, 2006, p. 22 col. 1 lines 1-11, col. 3 lines 13-14, p. 23 col. 1 lines 7-25, col. 2 lines 24-26.

Supplementary European Search Report issued in corresponding European Patent Application No. 07 84 6127; issued Aug. 25, 2010.

Partial Translation of previously submitted Chinese Published Application No. 1444377A.

Zhao, Yongbin "Mobile Switchboard Causing Greater Challenges for Fixed Network" Communication World. Aug. 28, 2001:9-11.

Zheng, Lan Implementation of VPMN Service. Fujian Mobile Communication Co., Ltd.

Written Opinion of the International Searching Authority issued in corresponding PCT Application No. PCT/CN2007/071301; mailed Apr. 3, 2008.

Office Action issued in corresponding Chinese Patent Application No. 200710005605.X; issued Apr. 2, 2010.

Office Action issued in corresponding Russian Patent Application No. RU2009136332, mailed Dec. 21, 2010.

* cited by examiner

CHARGING METHOD AND CONTROL DEVICE FOR GROUP MAIN LINE SERVICE

CROSS REFERENCE TO RELATED APPLICATION

This application is a continuation of International Patent Application No. PCT/CN2007/071301, filed on Dec. 21, 2007 which claims priority to Chinese Patent Application No. 200710005605.X, filed on Mar. 1, 2007; both of which are incorporated by reference herein in their entireties.

FIELD OF THE INVENTION

The present invention relates to the field of communication technology, and more particularly, to a charging method and a control device for Group Main Line service.

BACKGROUND

Group Main Line (GML) service created for group clients by operators integrating communication resources provides a brand new portal for corporation communication. With the GML service, a group of clients is provided with a Main Line Number (MLN), and each individual user is allocated an extension number. Meanwhile, various services such as group address book, conference telephone, mobile short-numbers and telephone redirection are integrated, and functions such as service consultation, telephone query, telephone redirection, corporation service, VIP hotline service, main line Color Ring Back Tone (CRBT) are provided to the users.

After a user dials a GML Number (GMLN), operations may be performed under the guidance of voice instructions which include but are not limited to the following.

1. Providing an automatic telephone redirection service if the extension number is dialed or the name of the called party is spoken out directly.
2. Redirecting the call to an attendant for human assistance. The attendant may be provided by the operator renting a helping center to the group of clients, or may be a human main line attendant of the group.
3. Providing corporation services. The call may be redirected to the Customer Service Center of the corporation, or a simple information delivery may be provided by the main line system for the group.
4. Providing a VIP Express Connection to a manager, which connects VIPs of the group to the designated VIP managers.
5. Playing the corporation CRBT after the call to the GML is redirected to the extension, or playing a personal CRBT if the extension is dialed directly.

The manpower cost of a corporation is reduced with the GML, and the labor intensity of the GML attendant is also reduced due to the voice-dialing function.

Currently, there are two solutions for implementing GML service. The first one is based on Intelligent Network (IN), and the second one is based on a value-added voice platform. The major difference between the first solution and second solution is that there is no alternative voice route in the first solution. In other words, the main line platform is no longer 'bridged' in the voice route when the call is redirected to the extension, and there is only one voice route from the calling party to the extension, saving a lot of relay resources and improving the security of the main line service system.

FIG. 1 is a diagram illustrating the prior art GML system based on IN. The GML service logic is implemented with an IN Service Control Point (SCP) and an Intelligent Peripheral (IP). The calling process is as follows:

1. A user 11 dials a GMLN;
2. A switch triggers the called process of the GML service to the SCP 10;
3. The SCP 10 issues an Establish Temporary Connection (ETC) signaling instructing the Mobile Switching Center (MSC) 12 to establish a connection to the IP 13;
4. The MSC 12 establishes a connection to the IP 13 through the Gateway Office 14;
5. The IP 13 interacts with the user 11, obtains the extension number to which the user wishes to connect, and submits the extension number to the SCP 10;
6. The SCP 10 issues a Disconnect Forward Connection (DFC) signaling instructing the MSC 12 to tear down the connection to the IP 13;
7. The SCP 10 issues a CONNECT signaling instructing the MSC 12 to connect to the called user 15.

The charging point of the GML service based on IN is the SCP, which generates call records for the calls made from the main line to the extensions and charges the main line.

Currently, for the charging of the extensions in the GML service, the calling charge and called charge for the call between the calling party and the extension user of the GML service are determined according to their respective category tariffs. Assuming that user A calls an MLN B, and then the call is redirected to user C, or user A calls the extension user C directly, the charging principle and call record information for user C is as follows: it is calculated as C answering normally the call from user A, that is, the displayed caller ID is the number of user A. In this case, in the call list of user C, the calling number is that of user A and the called number is that of user C. The communication charge of user C is handled by the charging and accounting system, which collectively processes the call records of user C and rates the call records according to the condition that C is a GML user.

GML provides a corporation with a uniform voice portal and facilitates users internal/external to the corporation. However, with the current charging method, it is impossible to directly control and distinguish the part of charge that is paid collectively by the GML and the part of charge that is paid by the individual. For an extension for which individual payment has already been applied in the operator network before joining the GML, collective payment by the group is applied by the group when the extension joins the GML. For a GML, it is desirable to distinguish the charge of an extension that is paid collectively by the group and the charge of the extension that is paid by the individual, in order to control the communication expense of the GML.

SUMMARY

The embodiments of the present invention provide a charging method for a GML service and a service control device, such that the charging policy for the group extension may be configured flexibly and the separation between the group charge and the individual charge may be realized.

An embodiment of the present invention provides a charging method for a GML service, which comprises:
receiving a call initiated by an extension of the GML and triggering an intelligent network, IN, service;
checking a called number of the call; and
processing the call initiated by the extension as a call collectively paid by the GML, if there is a predefined prefix for group service before the called number.

An embodiment of the present invention provides a charging method for a GML service, which comprises:

receiving a call to the GML and triggers an IN service;

redirecting the call to an extension of the GML according to a request from the calling party; checking, by a service control point, SCP, of the extension, the calling number upon receiving an initial detection point, IDP, message from a service switch point, SSP, of the calling party; and processing, by the SCP of the extension, the call to the extension as a call collectively paid by the GML, if there is a predefined special identification before the calling number.

An embodiment of the present invention provides a service control device, which comprises:

a service logic unit adapted to enable a corresponding service logic according to a call event reported by a service switch point, SSP, and issue a call control instruction to the SSP according to the service logic;

a charging unit adapted to charge a calling party or a called party in the call event and generate a call record, the service control device further includes:

a called number checking unit adapted to check the called number in the call event, and inform the service logic unit to process the calling party as an extension collectively paid by the GML if there is a predefined prefix of GML service before the called number.

An embodiment of the present invention provides a service control device, which comprises:

a service logic unit adapted to enable a corresponding service logic according to a call event reported by a service switch point, SSP, and issue a call control instruction to the SSP according to the service logic;

a charging unit adapted to charge a calling party or a called party in the call event and generate a call record, the service control device further includes:

a calling number checking unit adapted to check an initial call message from an SSP of the calling party in the call event, and inform the service logic unit to process the called party as an extension collectively paid by the group main line, GML, if there is a predefined special identification code before the calling number in the initial call message.

According to the technical solutions provided by the embodiments of the present invention in the above, the embodiments of the present invention identify the special prefix before the called number in the call initiated by the extension user of the GML through the IN service flow, thereby determining whether the call initiated by the extension of the GML should be processed as paid by the group collectively. Similarly, if the call answered by the extension of the GML is redirected by the main line, the call of the extension will be processed as a called party paid by the group collectively. With the embodiments of the present invention, the charge for the extensions answering the incoming call, the charge for the extension making a call and the charge for the personal service may be separated.

BRIEF DESCRIPTION OF THE DRAWINGS

FIG. 1 is a diagram illustrating the prior art GML system based on IN;

DETAILED DESCRIPTION

In order for those skilled in the art to understand the technical solutions of the present invention, the present invention will be further described in detail in the following with reference to the figures and embodiments.

Figure 1:
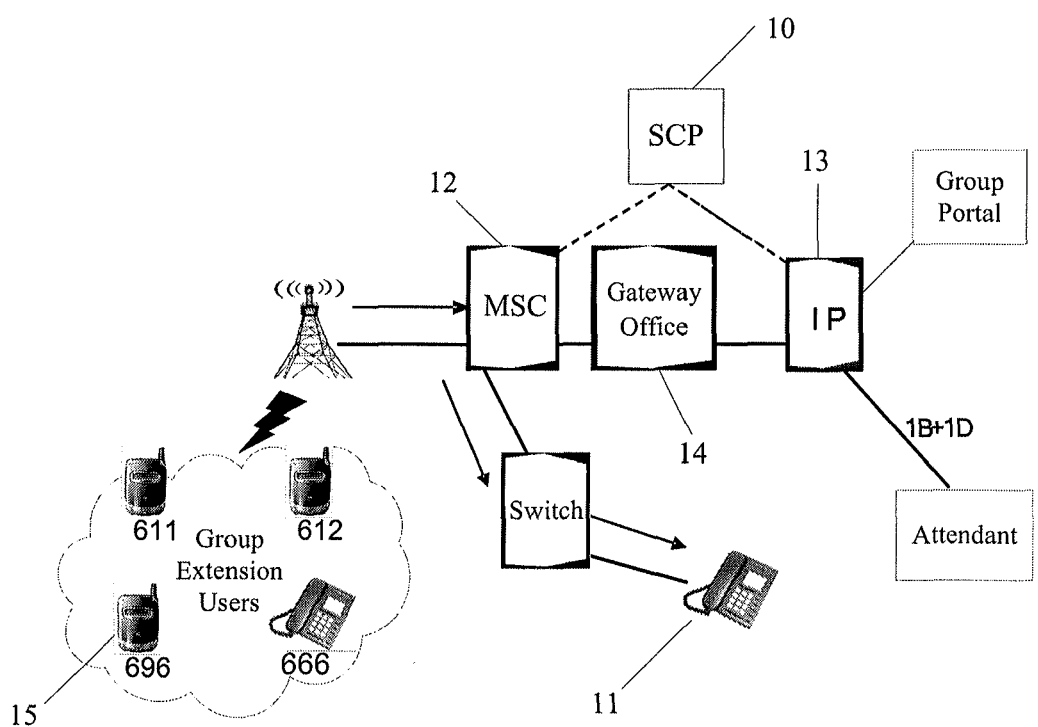
Figure 2:
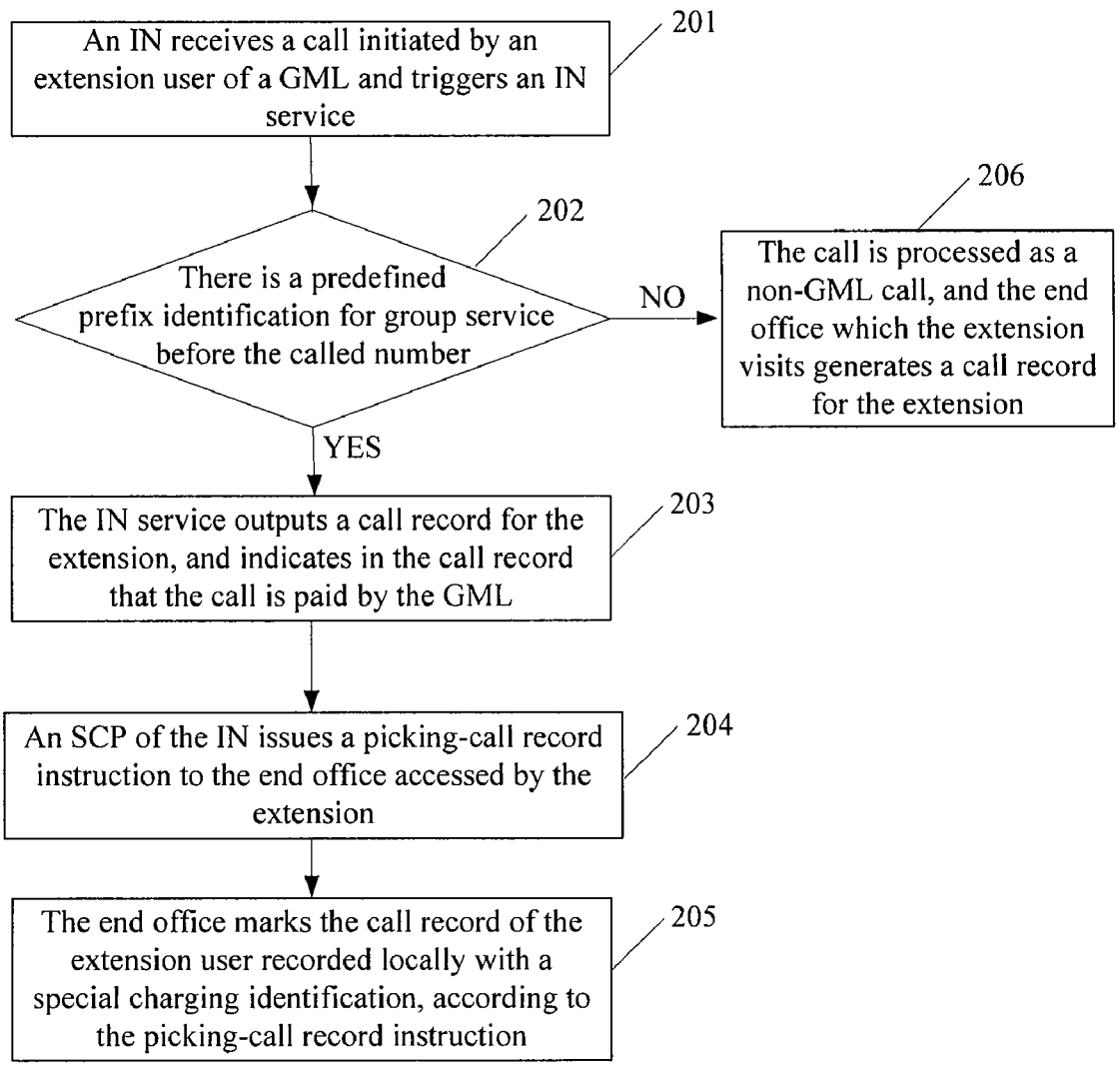
FIG. 2 is a flow chart illustrating the first embodiment of the method of the present invention.

The process of the first embodiment of the method of the present invention illustrated in FIG. 2 includes the following steps:

Step 201: An IN receives a call initiated by an extension user of a GML and triggers an IN service.

If the extension user is a fixed extension user, the IN service is triggered at a gateway office where the extension accesses the network. For example, it is triggered according to an access code.

If the extension user is a mobile extension user, the IN service is triggered at an end office accessed by the extension user. For example, it is triggered according to Originating CAMEL Subscription Information (O_CSI).

Step 202: The called number of the call is checked to determine whether there is a predefined prefix for group service before the called number. If there is a predefined prefix for group service before the called number, step 203 is executed. If there is no predefined prefix for group service before the called number, step 206 is executed.

Step 203: The IN service generates a call record for the extension, and indicates in the call record that the call is paid by the GML.

Step 204: The SCP of the IN issues a picking-call record instruction to the end office accessed by the extension.

Step 205: The end office accessed by the extension marks the call record of the extension user recorded locally with a special charging flag, according to the picking-call record instruction.

Step 206: The call is processed as a non-GML call, and the end office visited by the extension generates a call record for the extension.

In the above flow, when the IN service finds that there is a predefined prefix for group service before the called number, the GMLN may also be displayed at the caller ID display of the called party, according to the configuration of the GML.

To implement the process of the embodiment of the present invention described above, a system architecture shown in FIG. 3 may be used.

The extension user 31 initiates a call. Upon receiving the call, the visitor location Mobile Switch Center/Visitor Location Register/Service Switch Point (MSC/VLR/SSP) 33 transmits a signaling to the SCP 34 at the home location of the calling party to trigger the IN service. The SCP 34 identifies the call as paid collectively by the GML according to the prefix for group service before the called number, and issues a picking-call record instruction to the MSC/VLR/SSP 33. The MSC/VLR/SSP 33 connects the call to the visitor location MSC/VLR 35 of the called user 32.

Figure 3:
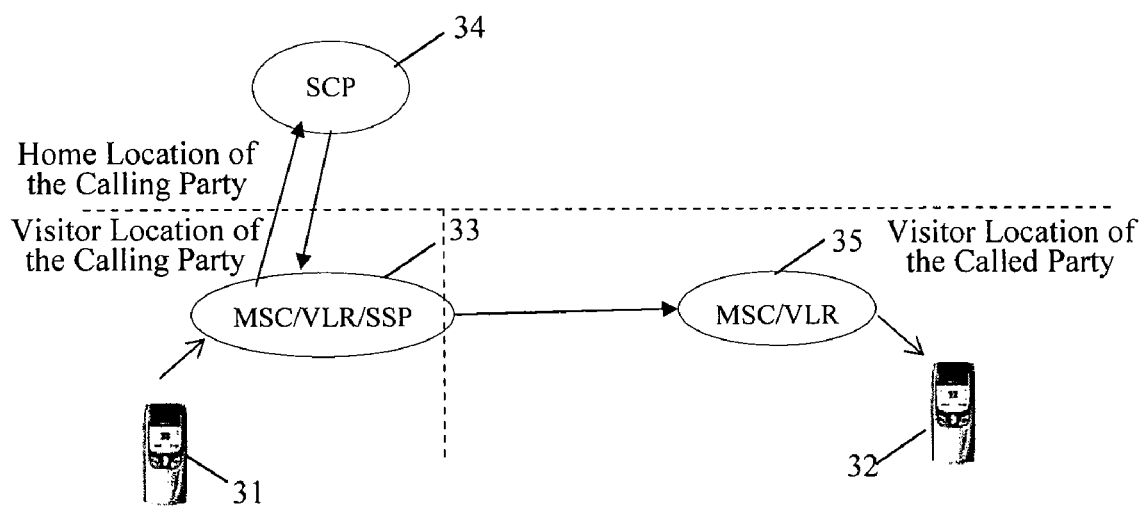
FIG. 3 is a diagram illustrating the system according to the first embodiment of the method of the present invention.
Figure 4:
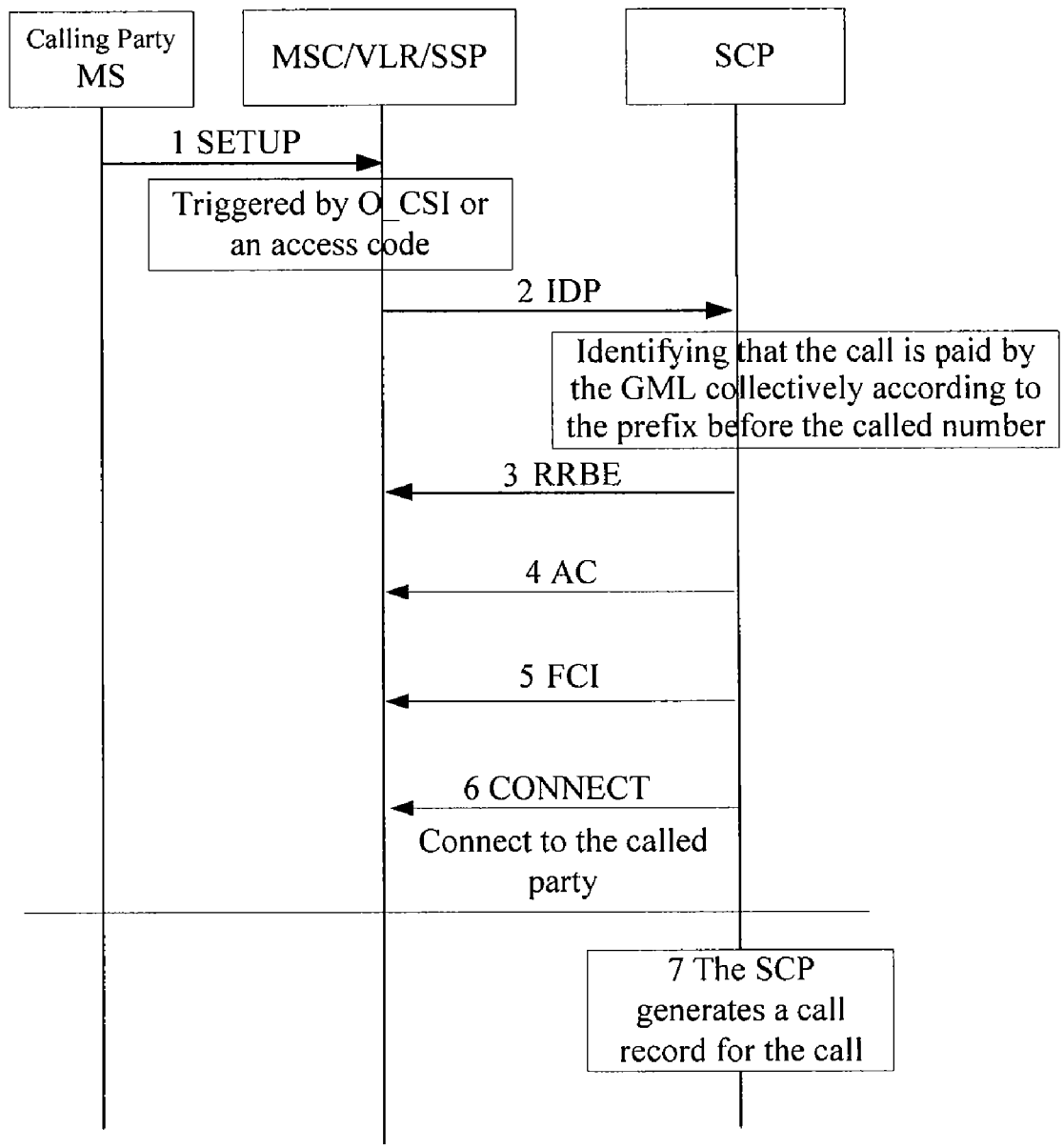
FIG. 4 is a flow chart illustrating the signaling interaction between the network entities in the system shown in FIG. 3.

FIG. 4 is a flow chart illustrating the signaling interaction between the network entities in the system shown in FIG. 3.

1. The extension user adds the special prefix before the called number and initiates the call, that is, a SETUP message is transmitted to the MSC/VLR/SSP of the Visitor Location of the user.

2. Upon receiving the call, the MSC/VLR/SSP at the Visitor Location of the calling user triggers the IN service according to the user subscription information stored at the VLR, and the SSP transmits an IDP message to the SCP of the main line service.

3. The IN service receives the IDP message transmitted by the SSP, finds that the calling party is a GML service user and identifies the call as paid by the group collectively according to the special prefix before the called number, and issues a Request Report Basic Call State Module (BCSM) Event (RRBE) signaling to the MSC/VLR/SSP at the Visitor Location of the calling user.

4. The SCP issues an Apply Charging (AP) signaling to the MSC/VLR/SSP at the Visitor Location of the calling user.

5. The SCP issues a Furnish Charging Information (FCI) picking-call record instruction to the MSC/VLR/SSP at the Visitor Location of the calling user, and requests the MSC to mark the call record of the calling user with the special charging flag, that is, to identify the call record as not a charging evidence according to the special identification or prefix.

6. The SCP peels off the special prefix from the called number and issues a CONNECT signaling. In the case that the outgoing call display configured by the GML is to display the MLN, the SCP fills in the parameter of Generic Number with the GMLN when issuing the CONNECT signaling.

7. When the call ends, the SCP generates the call record for the call and indicates in the call record that the call is paid by the GML collectively.

Figure 5:
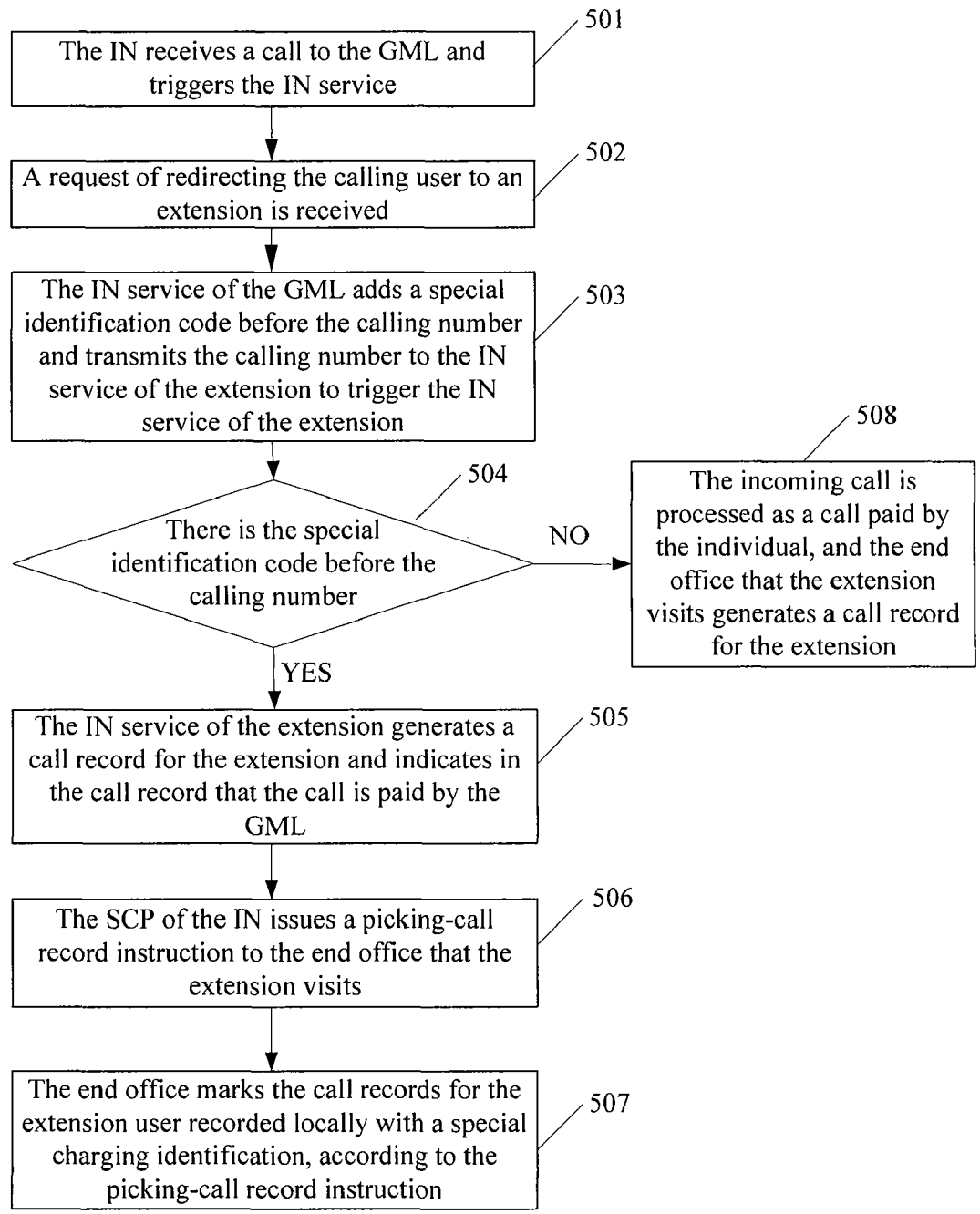
FIG. 5 is a flow chart illustrating the second embodiment of the method of the present invention.

FIG. 5 is a flow chart illustrating the second embodiment of the method of the present invention. The method includes the following steps:

Step 501: The IN receives a call initiated to the GML and triggers the IN service.

Step 502: A request is received indicating that the calling user needs to be connected to an extension.

Step 503: The IN service of the main line adds a special identification code before the calling number and transmits the calling number to the IN service for the extension to trigger the IN service for the extension.

Step 504: The IN service for the extension checks whether there is the special identification code before the calling number to be connected. If there is the special identification code before the calling number to be connected, step 505 is executed. If there is not a special identification code before the calling number to be connected, step 508 is executed.

Step 505: The IN service for the extension generates a call record and charges the extension and indicates in the call record that the call is paid by the GML.

Step 506: The SCP of the IN issues a picking-call record instruction to the end office which the extension visits.

Step 507: The end office marks the call records for the extension user recorded locally with a special charging flag, according to the picking-call record instruction.

Step 508: The incoming call is processed as a call to be paid by the individual, and the end office that the extension visits generates a call record and charges the extension.

In the above flow, if the IN service finds that there is the special identification code before the calling number, it may alternatively be displayed at the called party that the call is redirected by the main line, according to the configuration of the GML.

To implement the flow of the embodiment of the present invention described above, a system architecture shown in FIG. 6 may be employed.

The user 61 dials the GMLN and the MSC 63 triggers the called process of the GML service to the SCP 64. The SCP 64 issues an Establish Temporary Connection (ETC) signaling instructing the MSC 63 to establish a connection to the IP 65. The IP 65 interacts with the user 61 and obtains the number to which the user 61 wants to connect and submits the number to the SCP 64. The SCP 64 issues a Disconnect Forward Connection (DFC) signaling instructing the MSC 63 to tear down the connection to the IP 65. The SCP 64 issues a CONNECT operation according to the number submitted by the IP 65 instructing the MSC 63 to connect to the called user 62. The MSC 63 triggers the subscribed IN service to the SCP 66 according to the information of the called user. The SCP 66 finds that the call is redirected from the main line and identifies the call as paid by the GML collectively. The SCP 66 generates the call record and indicates in the call record that the call is redirected by the main line. Meanwhile, the SCP 66 adds the special prefix before the calling number and delivers the number. The special prefix+calling number is displayed at the called party, indicating that the call is redirected by the main line.

Figure 6:
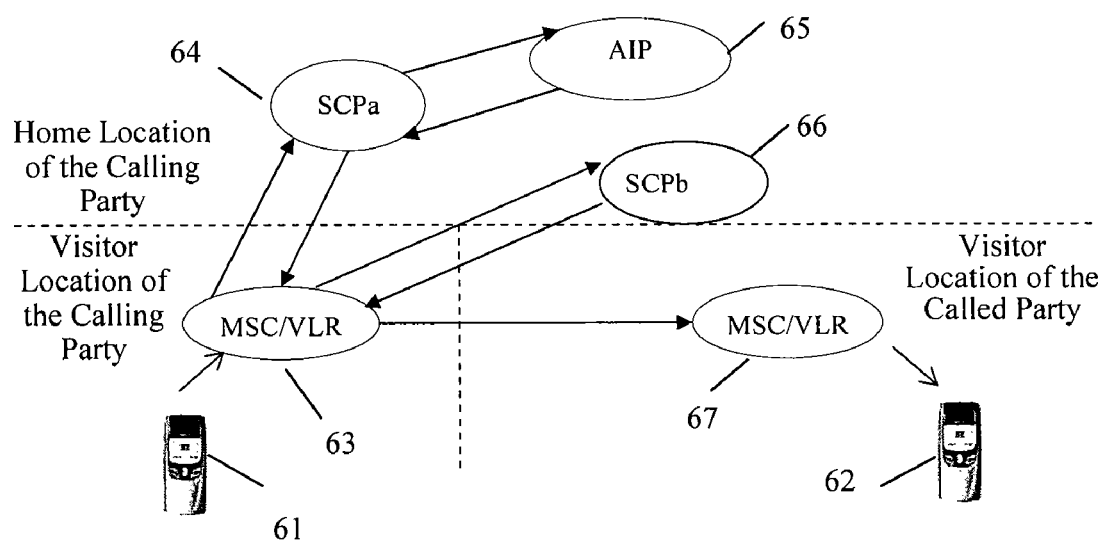
FIG. 6 is a diagram illustrating the system according to the second embodiment of the method of the present invention.
Figure 7:
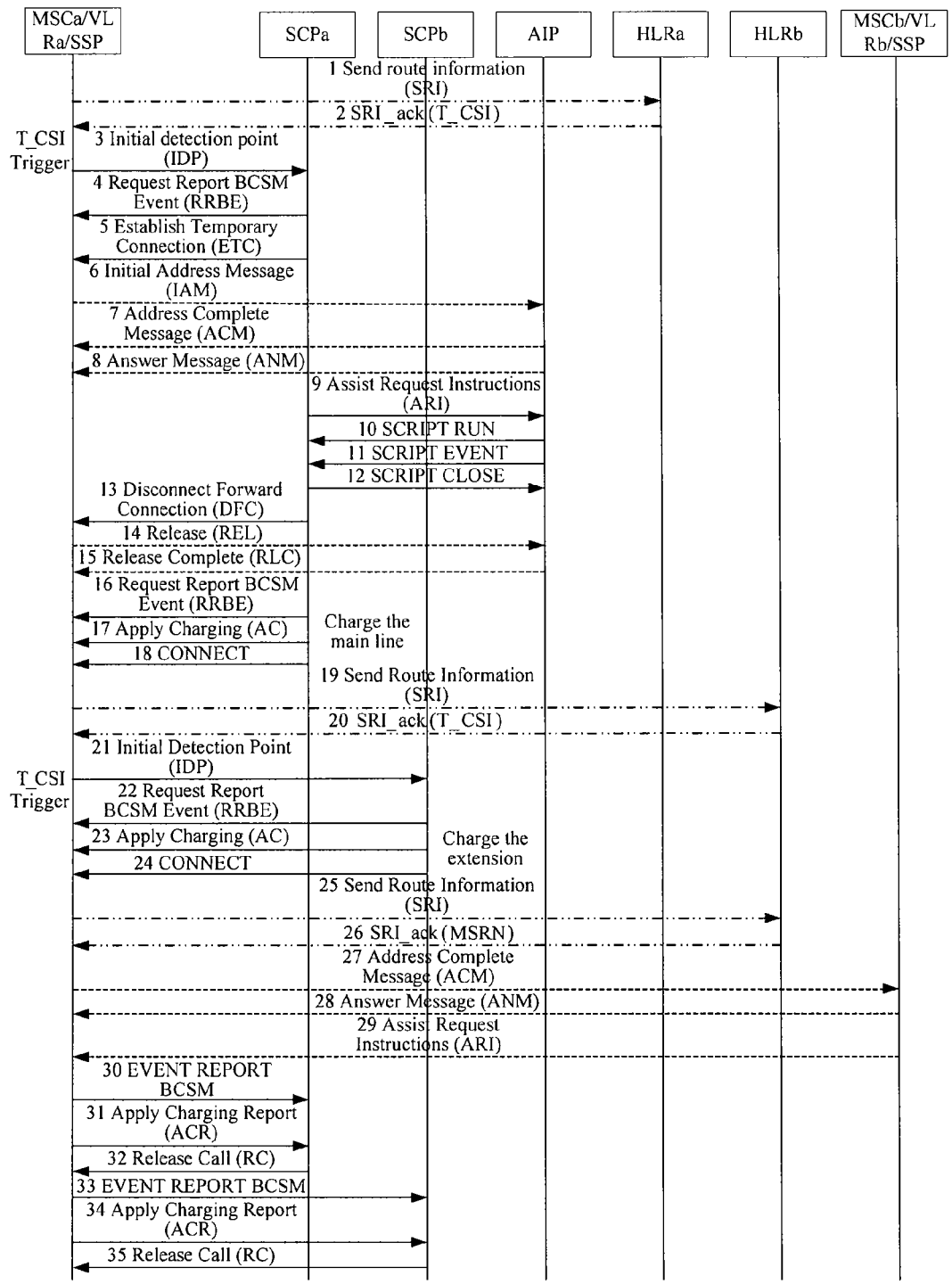
FIG. 7 is a flow chart illustrating the signaling interaction between the network entities in the system shown in FIG. 6.

FIG. 7 illustrates the process of the signaling interaction between the network entities in the system shown in FIG. 6.

1. The calling party dials the GMLN. The MSCa/VLRa/SSP receives the call message and transmits a Send Routing Information (SRI) message to the HLRa of the main line.

2. The HLRa of the main line transmits the subscription information Terminating CAMEL Subscription Information (T-CSI) to the MSCa/VLRa/SSP through an SRI_ack message.

3. The MSCa/VLRa/SSP obtains the address of the SCPa of the main line from the T-CSI data and transmits an Initial Detection Point (IDP) message to the SCPa and places the trunk code of the location of the GMSC/SSP or the initial MSC/VLR in the parameter LocationNumber in the IDP message.

4. When the SCPa receives the IDP message, it parses the called user account and finds that the called user is the main line. The SCPa then issues an RRBE signaling and requests the SSP to monitor the abandon event of the calling party.

5. The SCPa issues an ETC signaling and requests to establish a temporary connection with the IP.

6. The MSCa transmits an Initial address message (IAM) signaling to the IP.

7. The IP responds with an Address Complete Message (ACM).

8. The IP responds with an ANswer Message (ANM) and requests for charging.

9. The IP issues an AssistRequestInstructions (ARI) signaling to the SCP.

10. The SCPa issues a SCRIPT RUN operation and informs the IP to run the script.

11. The IP interacts with user and the user determines the number to be connected by inputting an extension short-number directly or speaking out information of the user to be connected or connecting to an attendant. The IP returns the number to be connected to the SCPa using a SCRIPT EVENT.

12. The SCPa issues SCRIPT CLOSE and requests the IP to stop running the script.

13. The SCPa issues a DFC signaling instructing to release the resource.

14. The MSCa transmits Release (REL) to the IP and requests to tear down the connection.

15. The IP replies a ReLease Complete (RLC) signaling to show the release is completed.

16. The SCPa determines the tariff according to the home location of the main line and the number to be redirected to and charges the main line and transmits an RRBE signaling to the MSCa/VLRa/SSP to request that the call be monitored.

17. The SCPa issues an AC signaling to request charging and monitoring.

18. The SCPa transmits the extension number to the SSP through a CONNECT operation and fills 'special identification code+calling number' in the parameter Generic Number in the CONNECT message.

19. Upon receiving the CONNECT message, the MSCa/VLRa/SSP transmits an SRI message to the HLRb of the extension according to the destination address.

20. The HLRb returns T_CSI through an SRI_ack signaling.

21. The MSCa/VLRa/SSP obtains the address of the SCPb of the extension from the T_CSI and transmits an IDP message to the SCPb, and places the trunk code of the location of the GMSC/SSP or the originating MSC/VLR in the parameter LocationNumber in the IDP message.

22. When the SCPb receives the IDP message, it parses the calling number and finds that there is the special identification code before the calling number and decides that the call is redirected by the main line and is paid by the GML collectively. The SCPb determines the tariff according to the home location of the called party and the actual location of the called party and the defined discount, and issues an RRBE signaling to the MSCa/VLRa/SSP, and requests that the call be monitored.

23. The SCPb issues an AC signaling and requests for charging.

24. The SCPb transmits the called number to the SSP through a CONNECT operation. 'picking-call record prefix+ special prefix+calling number' is filled in the Generic Number in the CONNECT signaling, where the special prefix is added in the outgoing call process discussed above which identifies the call as collectively paid by the main line.

25. Upon receiving the CONNECT signaling, the MSCa/VLRa/SSP transmits an SRI message to the HLRb again.

26. The HLRb returns the Mobile Switch Roam Number (MSRN) of the called party through an SRI_ack signaling.

27. The MSCa/VLRa/SSP makes the connection according to the MSRN of the called party. The MSCa transmits an IAM signaling and connects to the visitor MSCb of the called party.

28. The called party rings and the MSCb returns an ACM signaling to the MSCa.

29. When the called party answers the call, the MSCb returns an ANM signaling to the MSCa and requests for charging. The calling and called parties start to communicate.

30. The call ends and the calling party hangs up. The MSCa/VLRa/SSP transmits an EVENT REPORT BCSM (ERB) to the SCPa.

31. The MSCa/VLRa/SSP transmits an Apply Charging Report (ACR) signaling to the SCPa and reports the hangup of the calling party and the charging result.

32. The SCPa issues a Release Call (RC) signaling instructing the MSCa to release the call.

33. The MSCa/VLRa/SSP transmits an ERB signaling to the SCPb to report to the SCPb that the calling party has hung up.

34. The MSCa/VLRa/SSP transmits an ACR signaling to the SCPb to report to the SCPb the calling_party_hang_up event and the charging result.

35. The SCPb issues an RC signaling to instruct the MSCa to release the call. The SCPa and SSP generate the call record for the call. The home SCPb of the extension generates the call record for the call and indicates in the call record that the call is redirected by the main line and is paid by the GML collectively.

Those skilled in the art may appreciate that all or part of the steps in the method according to the above embodiments may be implemented with a program which instructs the related hardware to perform the steps. The program may be stored on a computer readable storage medium such as an ROM/RAM, a magnetic disc and an optical disk.

Figure 8:
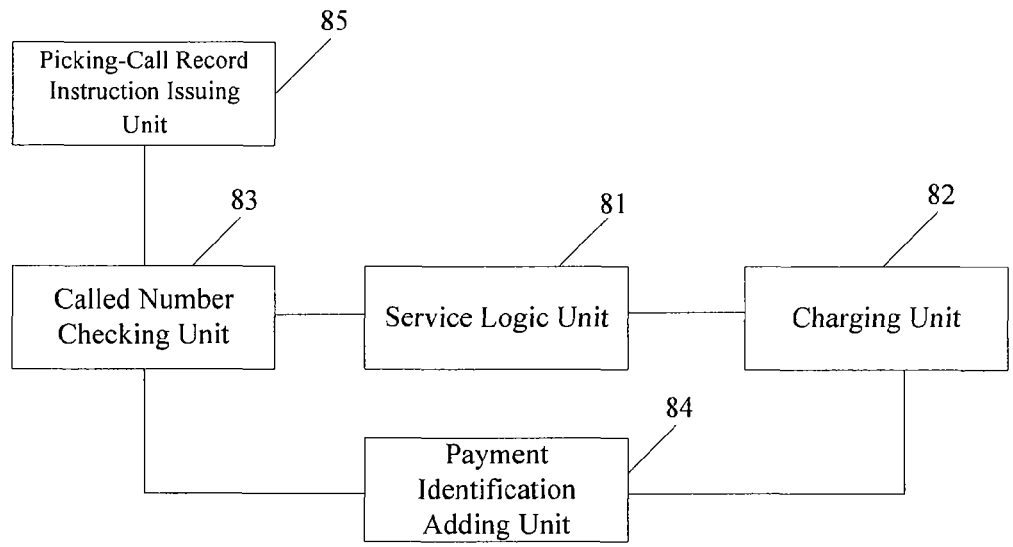
FIG. 8 is a block diagram illustrating the first embodiment of the service control device of the present invention.

Refer now to FIG. 8, which is a block diagram illustrating the principle of the first embodiment of the service control device of the present invention.

In the embodiment, the service control device is adapted to perform charging on the calls initiated by the extensions of the GML service and includes a service logic unit 81, a charging unit 82 and a called number checking unit 83.

The service logic unit 81 is adapted to enable a corresponding service logic according to the call event reported by the SSP, and issue a call control instruction to the SSP according to the service logic. The charging unit 82 is adapted to charge a calling or called party in the call event and generate a call record. The called number checking unit 83 is adapted to check the called number in the call event. If there is a predefined prefix of group service before the called number, the service logic unit is informed to process the calling party as a user collectively paid by the group.

When the group extension user initiates a call as the calling party, if there is the predefined prefix for group service added before the called number, the called number checking unit 83 may detect the prefix for group service. In this case, the service logic unit 81 is informed that the calling party should be processed as a user collectively paid by the group. When the group extension user initiates a call as the calling party, if there is no predefined prefix for group service added before the called number, the service logic unit 81 is notified to process the calling party as a call not collectively paid by the group. The service logic unit 81 instructs the charging unit 82 about the way of charging the calling party according to the notification.

In order to effectively distinguish the two cases of paying for the call of the calling party by the group and by the individual, a payment flag adding unit 84 and a picking-call record instruction issuing unit 85 may also be provided in the service control device according to the embodiment of the present invention. The payment flag adding unit 84 is adapted to add a flag indicating that the call is paid by the GML to the call record generated by the charging unit 82 for the calling party, when the called number checking unit 83 finds that there is the predefined prefix for group service before the called number. The picking-call record instruction issuing unit 85 is adapted to issue a picking-call record instruction to the end office visited by the calling party instructing the end office to delete the call record of the calling party, when the called number checking unit 82 finds that there is the predefined prefix for group service before the called number. Thus, when a charging center in a system receives the call record generated by the charging unit 82, it may charge the calling party based on whether the call record has the flag indicating that the call is paid by the GML, thereby the separation between the charge for outgoing calls of the group extension and charge for personal service is realized.

Figure 9:
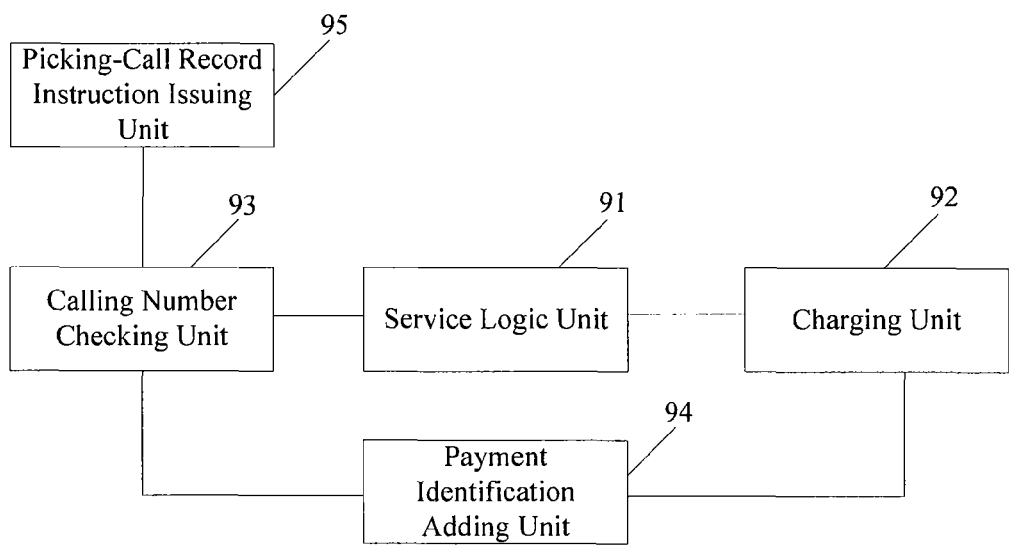
FIG. 9 is a block diagram illustrating the second embodiment of the service control device of the present invention.

Refer now to FIG. 9, which is a block diagram illustrating the principle of the second embodiment of the service control device of the present invention.

In the embodiment, the service control device is adapted to perform charging on the call made to the extensions of the GML service and includes a service logic unit 91, a charging unit 92 and a calling number checking unit 93.

The service logic unit 91 is adapted to enable a corresponding service logic according to the call event reported by the SSP, and issue a call control instruction to the SSP according to the service logic. The charging unit 92 is adapted to charge the calling or called party in the call event and generate a call record. The calling number checking unit 93 is adapted to check the initial call message from the SSP of the calling party in the call event. If there is a predefined special identification code before the calling number in the initial call message, the service logic unit 91 is informed to process the called party as a user collectively paid by the group.

When the calling party dials the GMLN, the SCP of the GML finds that the called user is a GMLN and establishes a temporary connection with the IP. The IP interacts with the calling user. The calling user determines the number to be connected by inputting an extension short-number directly or speaking out information of the user to be connected via voice or connecting to an attendant. The IP transmits the number to be connected to the SCP of the GML, the SCP of the GML transmits the extension number to the SSP and modifies the calling number as special identification code+calling number. Thus, when the service control device according to the embodiment of the present invention receives the initial call message from the SCP of the GML, the calling number detection unit 93 can find that the calling number in the IDP message has the special identification code before it. In this case, the service logic unit 91 is notified to process the called party (i.e., the group extension user) as a user paid collectively by the group. If the calling number checking unit 93 does not find that the calling number in the IDP message has the special identification code before it, the calling number checking unit 93 notifies the service logic unit 91 to process the called party (i.e., the group extension user) as a user paid by the individual. The service logic unit 91 instructs the charging unit 82 about the way of charging the calling party according to the notification.

In order to effectively distinguish the two cases of paying for the call of the called party by the group and by the individual, a payment flag adding unit 94 and a picking-call record instruction issuing unit 95 may also be provided in the service control device according to the embodiment of the present invention. The payment flag adding unit 94 is adapted to add a flag indicating that the call is paid by the group to the call record generated by the charging unit 92 for the called party, when the calling number checking unit 93 finds that there is the predefined special identification code before the calling number. The picking-call record instruction issuing unit 95 is adapted to issue a modify-calling-number signaling to the end office accessed by the called party, when the calling number checking unit 93 finds that there is the predefined special identification code before the calling number; where the modify-calling-number signaling carries picking-call record prefix information and is used to instruct that the called call record is generated by the visited end office. The calling number is modified such that the charging accounting system identifies that the call record is invalid.

Thus, when a charging center in a system receives the call record generated by the charging unit 92, it may charge the calling party based on whether the call record has the flag indicating that the call is paid by the group, thereby the separation between the charge for the incoming call and the charge for personal service of the group extension is realized.

To realize both the separation between the charge for outgoing calls of the group extension and the charge for personal service and the separation between the charge for incoming call of the group extension and the charge for personal service, the called number checking unit and calling number checking unit in the embodiments as shown in FIGS. 8 and 9 may be integrated onto a single service control device. When a user with the service control device initiates a call as the group extension user, the called number that the user calls may be checked. When a user of the service control device answers an incoming call as the group extension user, the calling number of the incoming call may be checked. The service logic unit is then notified whether to process the outgoing/incoming call of user as paid by the group collectively or by the individual according to the checking result. For detailed processing procedures, please refer to the description in the above embodiment, which will not be repeated here.

According to the technical solutions provided by the embodiments of the present invention in the above, the embodiments of the present invention identifies the special prefix before the called number in the call initiated by the extension user of the GML through the IN service process, thereby determining whether the call initiated by the extension of the GML should be processed as paid by the group collectively. The incoming call is processed similarly in the IN service process (called process of the main line). If the calling user requests to be connected to the extension of the GML, the call control network element related to the extension is informed that the call is redirected from the main line by using the special identification code. Thereby the call of the extension is processed as a called party paid by the group collectively.

With the embodiments of the present invention, the charges for the extensions answering the incoming call, the extension making a call and the charge for the personal service may be separated. The advantages are three-folded. Firstly, when the operators provide the GML with the GML service, the charging policies for the extensions may be configured flexibly by differentiating the call charges of the extension and the processing may be done according to the extension call record. Only the call records identified as paid by the group collectively will be included in the group payment, which helps to attract the users. Secondly, the group may differentiate the part of charge paid by the group and that paid by the individuals when paying for the GML service, which helps to control the charge expense of the group. Finally, the extension user may enjoy the benefit of both the main line payment and the service promotions applied by the individual.

What are described above are only preferred embodiments of the present invention, and are not intended to limit the scope of the disclosure. Any modification and equivalent substitution within the technical scope of the disclosure obvious to those skilled in the art are intended to be included in the scope of the disclosure.

What is claimed is:

1. A charging method for Group Main Line (GML) service, comprising:
   receiving a call initiated by an extension of the GML and triggering an Intelligent Network (IN) service;
   checking a called number of the call;
   processing the call initiated by the extension as a call collectively paid by the GML, if there is a predefined prefix for a group service before the called number, and processing the call initiated by the extension as a call not paid by the GML, if the predefined prefix for the group service is not present, wherein the step of processing the call initiated by the extension as the call collectively paid by the GML comprising:
   generating by a service control point (SCP), a call record for the extension which initiated the call, and indicating in the call record that the initiated call is paid by the GML;

issuing by the SCP, a picking-call record instruction to an end office accessed by the extension; and marking by the end office, the call record for the extension recorded locally with a special charging flag, according to the picking-call record instruction.

2. The method of claim 1, further comprising, triggering the IN service at a gateway office where the extension accesses a network, if the extension is a fixed extension; or triggering the IN service at the end office accessed by the extension, if the extension is a mobile extension.

3. The method of claim 1, wherein the method further comprising:

displaying the GML number at a caller ID display of the called party.

4. The method of claim 1, wherein the method further comprising:

processing the call as a non-GML call, if the IN finds that there is no predefined prefix for the group service before the called number.

5. A charging method for Group Main Line (GML) service, comprising:

receiving a call to the GML and triggering an Intelligent Network (IN) service;

redirecting the call to an extension of the GML according to a request from the calling party;

checking, by a Service Control Point (SCP) of the extension, the calling number upon receiving an Initial Detection Point (IDP) message from a Service Switch Point (SSP) of the calling party; and processing, by the SCP of the extension, the call initiated by the extension as a call collectively paid by the GML, if there is a predefined special identification before the calling number and processing the call initiated by the extension as a call not paid by the GML, if a predefined prefix is not present, wherein the step of processing the call initiated by the extension as a call collectively paid by the GML comprising:

generating, by the SCP of the extension, a call record for the extension, and indicating in the call record that the initiated call is paid by the GML;

issuing, by the SCP of the extension, a picking-call record instruction to an end office which the extension visits; and marking, by the end office, the call record for the extension recorded locally with a special charging flag, according to the picking-call record instruction.

6. The method of claim 5, wherein the step of redirecting the call to an extension of the GML according to a request from the calling party comprising:

establishing, by the SCP of the GML, a temporary connection to an intelligent peripheral, IP;

interacting, by the IP, with the calling party to obtain an extension number to which the calling party intends to be redirected;

transmitting, by the IP, the extension number to the SCP of the GML; and transmitting, by the SCP of the GML, the extension number to the SSP of the calling party through a CONNECT message, and modifying the calling number in the CONNECT message and adding a special identification code before the calling number.

7. The method of claim 5, wherein the method further comprising:

displaying that the call is redirected by the GML at a caller ID display of the extension.

8. A service control device, comprising:

a service logic unit which enables a corresponding service logic according to a call event reported by a Service Switch Point (SSP) and issue a call control instruction to the SSP according to the service logic; and a charging unit which charges a calling party or a called party in the call event and generates a call record;

wherein the service control device further comprises:

a called number checking unit which checks the called number in the call event, and informs the service logic unit to process the calling party as an extension collectively paid by the GML if there is a predefined prefix for a group service before the called number and to process the call initiated by the extension as a call not paid by the GML, if the predefined prefix is not present, wherein the service control device further comprises:

a payment flag adding unit which adds a flag indicating that the call is paid by the GML to the call record generated by the charging unit for the calling party, when the called number checking unit finds that there is the predefined prefix for group service before the called number; and a picking-call record instruction issuing unit which issues a picking-call record instruction to an end office visited by the calling party instructing the end office to pick the call record of the calling party, when the called number checking unit finds that there is the predefined prefix for group service before the called number.

9. A service control device, comprising:

a service logic unit which enables a corresponding service logic according to a call event reported by a Service Switch Point (SSP) and issues a call control instruction to the SSP according to the service logic; and a charging unit which charges a calling party or a called party in the call event and generates a call record;

wherein the service control device further comprises:

a calling number checking unit which checks an initial call message from an SSP of the calling party in the call event, and informs the service logic unit to process the called party as an extension collectively paid by the Group Main Line (GML) if there is a predefined special identification code before the calling number in the initial call message, and to process the call initiated by the extension as a call not paid by the GML, if a predefined prefix is not present, wherein the service control device further comprising:

a payment flag adding unit which adds a flag indicating that the call is paid by the GML to the call record generated by the charging unit for the called party, when the calling number checking unit finds that there is the predefined special identification code before the calling number; and a picking-call record instruction issuing unit which issues a picking-call record instruction to an end office visited by the called party when the calling number checking unit finds that there is the predefined special identification code before the calling number.

* * * * *